`US006996776B1`

(12) United States Patent
Makely et al.

(10) Patent No.: US 6,996,776 B1
(45) Date of Patent: Feb. 7, 2006

(54) METHOD AND SYSTEM FOR SGML-TO-HTML MIGRATION TO XML-BASED SYSTEM

(75) Inventors: Gary R. Makely, Cary, NC (US); Carl T. Anderson, Apex, NC (US); Keith A. Wells, Angier, NC (US); Gregory F. Bush, Morrisville, NC (US); Susan R. Mazzara, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/572,976

(22) Filed: May 16, 2000

(51) Int. Cl.
 *G06F 17/00* (2006.01)
(52) U.S. Cl. .................... 715/523; 715/513; 715/501.1
(58) Field of Classification Search ............... 715/523, 715/522, 513, 501.1; 707/513
 See application file for complete search history.

(56) References Cited

U.S. PATENT DOCUMENTS

| 5,671,428 A | * | 9/1997 | Muranaga et al. .......... 715/751 |
| 5,793,368 A | | 8/1998 | Beer ........................ 345/334 |
| 5,802,530 A | | 9/1998 | Van Hoff .................. 707/513 |
| 5,933,140 A | | 8/1999 | Strahorn et al. ........... 345/338 |
| 5,953,731 A | | 9/1999 | Glaser ...................... 707/513 |
| 5,987,466 A | | 11/1999 | Greer et al. ............... 707/10 |
| 6,021,202 A | * | 2/2000 | Anderson et al. .......... 705/54 |
| 6,085,196 A | * | 7/2000 | Motoyama et al. ......... 707/102 |
| 6,182,029 B1 | * | 1/2001 | Friedman .................... 704/9 |
| 6,353,840 B2 | * | 3/2002 | Saito et al. ................ 715/517 |
| 6,389,385 B1 | * | 5/2002 | King ........................ 703/27 |
| 6,466,940 B1 | * | 10/2002 | Mills ........................ 707/102 |
| 6,519,597 B1 | * | 2/2003 | Cheng et al. ............... 707/10 |
| 6,535,896 B2 | * | 3/2003 | Britton et al. ............. 715/523 |
| 6,565,609 B1 | * | 5/2003 | Sorge et al. ............... 715/503 |

OTHER PUBLICATIONS

JavaHelp(tm) 1.0 Specification, Copyright 1998☐☐http://java.sun.com/products/javahelp/spec-1.0.pdf.*
U.S. Appl. No. 09/174,709, filed Oct. 19, 1998, Douglas R. Petty and Scott A. Sylvester, "Specification Language for Defining User Interface Panels That are Platform-Independent."
Kantner & Rusinsky, "Designing a WinHelp Project for Quick Conversion to Lowest-Common-Denominator HTML-Based Help: A Case Study," *Proceedings Intl. Conf. of Computer Documentation*, 214-218 (1998).
"Generic Converter for Standard Generalized markup Language Documents," *IBM Technical Disclosure Bulletin*, 41(1), 97-98 (1998).
"Web Browser Based Help for Java Applets," *IBM Technical Disclosure Bulletin*, 41(1), 527-528 (1998).

(Continued)

*Primary Examiner*—Heather R. Herndon
*Assistant Examiner*—Adam Queler
(74) *Attorney, Agent, or Firm*—Synnestvedt & Lechner LLP; Gregory M. Doudnikoff

(57) ABSTRACT

A technique, system, and computer program by which content created from source files in a first data format and converted to presentation files in a second data format can be read and used by a subsystem which reads content in a third data format other than the first and second data formats. Identifying information from the source files and/or presentation files is extracted and stored in a map file in the third format. If desired, a Table of Contents (TOC) file in the third data format can also be created by using the map file and a TOC file in the second data format. The first data format can be Standardized General Markup Language (SGML), the second data format can be HyperText Markup Language (HTML) and the third data format can be Extensible Markup Language (XML).

21 Claims, 3 Drawing Sheets

OTHER PUBLICATIONS

"Reviewing Tag Based On-Line Help Information," *IBM Technical Disclosure Bulletin*, 33(6B), 417-418 (1990).

"General and Context-Sensitive Help in Browsers," *IBM Technical Disclosure Bulletin*, 40(11), 151-152 (1997).

* cited by examiner

METHOD AND SYSTEM FOR SGML-TO-HTML MIGRATION TO XML-BASED SYSTEM

BACKGROUND OF THE INVENTION

1. Field of the Invention

The present invention relates to file/document conversion in a computer system, and deals more particularly with a method, system, and computer program for conversion of HTML files/documents created from SGML source files to a format readable and useable by a subsystem utilizing an XML format.

2. Description of the Related Art

The recent explosion in the use of the World Wide Web (hereinafter "the web") has created numerous opportunities for programmers to create and make available software developments usable in the web environment.

Frequently web-based programs consist of several smaller programs which interact with each other to perform the various functions of a particular web page. For example, a single web page may include hyperlinks which, when activated, launch a "plug-in", a Java applet, a "help" menu, or any of a myriad of other programs which enhance the use of the web page.

As an example, as web pages become increasingly more complex, web page designers often find it necessary to make some form of instructional, or help, information optionally available to the user. Typically, help information for a web page requires loading of a new HTML page into the browser, and when the user is finished reading the help information, loading the original HTML page back into the browser. Recently, Sun Microsystems, Inc. of Palo Alto, Calif. introduced a program called JavaHelp™ which is a platform-independent help system that enables developers and authors to incorporate on-line help in applets, components, applications, operating systems, and devices. Authors can also use the JavaHelp software to deliver on-line documentation for the web and corporate intranets.

Many programs such as JavaHelp require the use of data formatted in Extensible Mark-up Language (XML) to properly function. XML is quite flexible in its ability to be made to function in many different "domains" (i.e., user-defined sets of information), such as a mathematics domain, a Java domain, etc. and thus the use of XML is increasing. Meanwhile, software developers writing text (such as help documents) for use in connection with the JavaHelp or other XML-based programs, generally choose to deliver their documentation in HTML format based on documentation originally authored in SGML source code. The SGML source files are converted to the format of choice (e.g., HTML, PDF, PostScript, RTF, etc.) before the final product is delivered for use.

Authoring this documentation in SGML format offers may advantages, including the flexibility of being able to convert the SGML code to, and deliver the final product in, a variety of different formats (e.g., HTML, PostScript, RTF, and/or PDF); the ability to share information across all of the documents in the particular application being created; and the ability to perform the previously-mentioned functions while maintaining a single set of source files. Using a single set of SGML source files allows the programmers to learn only one set of tagging codes to create the SGML source files, which can then be used to create final documentation in a format preferred by the end-user. Further, the SGML source files can be shared among the programmers to avoid duplication of effort, even though two programmers may be providing the end-product to their respective customer in different formats.

Although programs such as JavaHelp can display HTML-formatted documents, the filenames generated when transforming the documentation from the SGML source files to the HTML documents are dynamically generated. As a result, for example, information contained in a file named "HTML009.HTML" for a given version of the HTML output might be contained in file "HTML012.HTM" in a future version of the same document. Because of this, programs such as JavaHelp, which utilize static (fixed) file names, may not be able to immediately access the correct help file when the user attempts to retrieve it. In addition, the conversion process from the SGML source files to the HTML document file assumes that the created document will be used in a browser-type environment and, thus, provides an HTML version of the Table of Contents (TOC). This TOC also utilizes dynamic file names and hotlinks generated during the conversion process. Programs such as JavaHelp require an XML version of the Table of Contents based on a fixed identifier associating the various help files to the corresponding portion of the GUI. Accordingly, a conflict exists between the XML and HTML files.

Typically, to resolve this conflict, developers manually create a set of help source files, map files and a TOC to accommodate the XML-based program's requirements. This requires the developer to maintain two separate yet identical (in terms of content) sets of source files (an SGML set and an HTML set) or, if the source was converted from SGML to HTML, the developer loses all of the previously-mentioned advantages provided by the use of an SGML source base.

Thus, a need exists for a technique by which a software developer developing files using SGML source files can seamlessly and automatically present the HTML files generated from the SGML source files to an XML environment without the need to maintain multiple sets of content-identical source files.

SUMMARY OF THE INVENTION

An object of the present invention is to provide a technique whereby HTML documents converted from SGML source files can be utilized by an XML-based program.

Another object of the present invention is to provide a technique by which content created from source files in a first data format and converted to presentation files in a second data format can be read and used by a subsystem which reads content in a third data format other than the first and second data formats.

It is another object of the present invention to provide a technique whereby this creation of files readable in the third data format is accomplished automatically by the creation of a map file in the third format which links the subsystem to the appropriate files in the first and second data formats.

It is a further object of the present invention to provide a technique whereby the map file is also used to create a Table of Contents (TOC) file in the third data format To achieve the foregoing objects, and in accordance with the purpose of the present invention as broadly described herein, the present invention provides, in a software-implemented process for use in a computing environment having a system which makes content available for use by a subsystem, the content being converted from source files in a first data format to presentation files in a second data format, the subsystem reading the content in a third data format other than the first or second data formats, a computerized method of indexing the content so that it can be correctly accessed and displayed by the subsystem, comprising the steps of: (1) extracting identifying information from the source file; (2) creating a map file in the third data format containing the extracted identifying information; and (3) configuring the subsystem to access and display the presentation files in the second data format based on the map file. Preferably, the first data format is Standardized General Markup Language (SGML), the second data format is HyperText Markup Language (HTML) and the third data format is Extensible Markup Language (XML).

Additionally, the present invention provides, in a computing environment having a system which makes content available for use by a subsystem, the content being converted from source files in a first data format to presentation files in a second data format, the subsystem reading the content in a third data format other than the first or second data formats, computer readable code readable by a computer in the environment, for indexing the content so that it can be correctly accessed and displayed by the subsystem, comprising: (1) a subprocess for extracting identifying information from the source file; (2) a subprocess for creating a map file in the third data format containing the extracted identifying information; and (3) a subprocess for configuring the subsystem to access and display the presentation files in the second data format based on the map file. Preferably, the first data format is Standardized General Markup Language (SGML), the second data format is HyperText Markup Language (HTML) and the third data format is Extensible Markup Language (XML).

Additionally, the present invention provides a system for making content available in a computing environment for use by a subsystem, the content being converted from source files in a first data format to presentation files in a second data format, the subsystem reading the content in a third data format other than the first or second data formats, the content being indexed so that it can be correctly accessed and displayed by the subsystem, comprising: (1) means for extracting identifying information from the source file; (2) means for creating a map file in the third data format containing the extracted identifying information; and (3) means for configuring the subsystem to access and display the presentation files in the second data format based on the map file. Preferably, the first data format is Standardized General Markup Language (SGML), the second data format is HyperText Markup Language (HTML) and the third data format is Extensible Markup Language (XML).

The present invention will now be described with reference to the following drawings, in which like reference numbers denote the same element throughout.

DETAILED DESCRIPTION OF THE PREFERRED EMBODIMENTS

Figure 1:
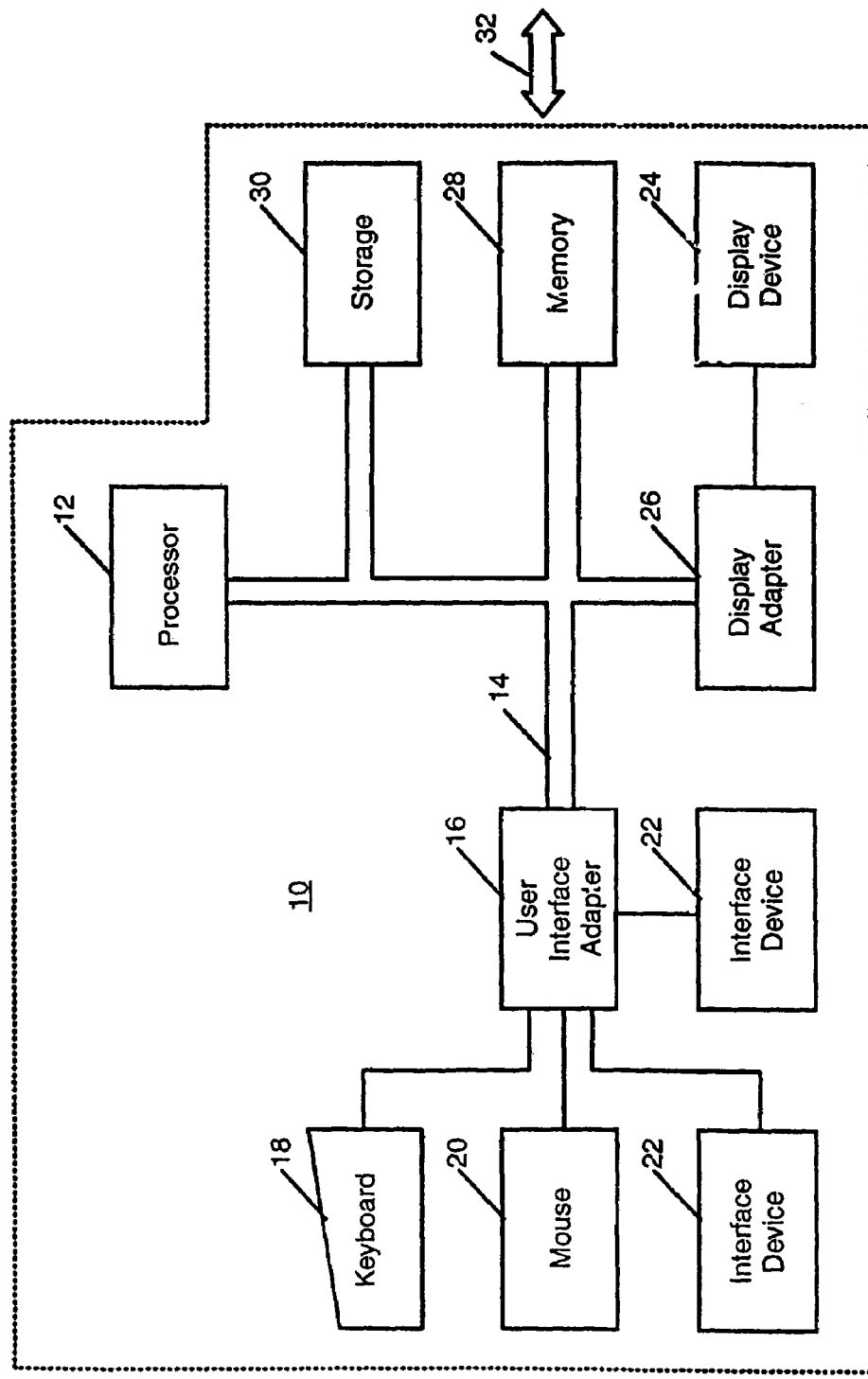
FIG. 1 is a pictorial representation of a data processing system which may be utilized to implement the present invention.

FIG. 1 illustrates a representative workstation hardware environment in which the present invention may be prac-
ticed. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
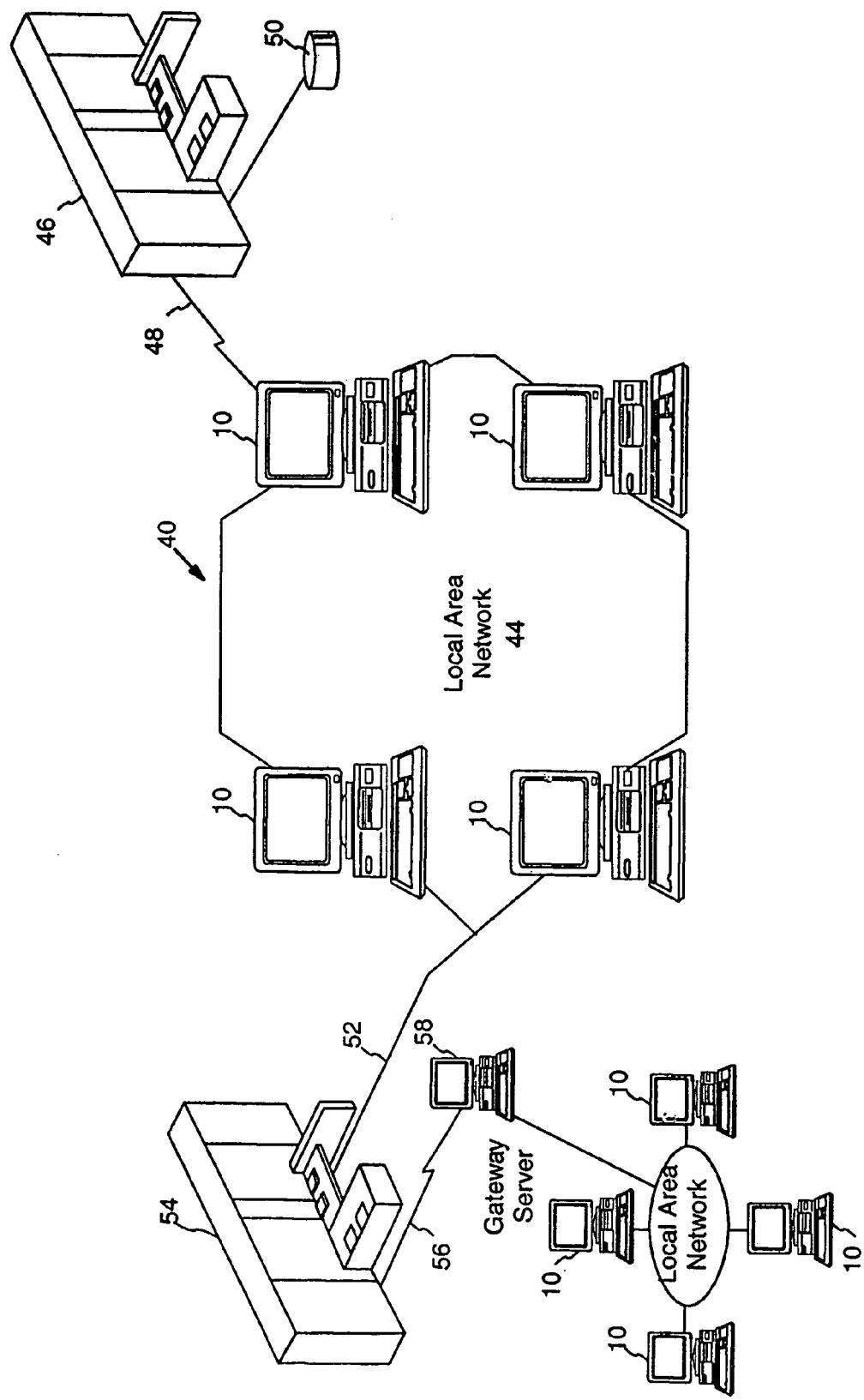
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server.

The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

A preferred embodiment of the present invention will now be discussed with reference to FIG. 3.

Figure 3:
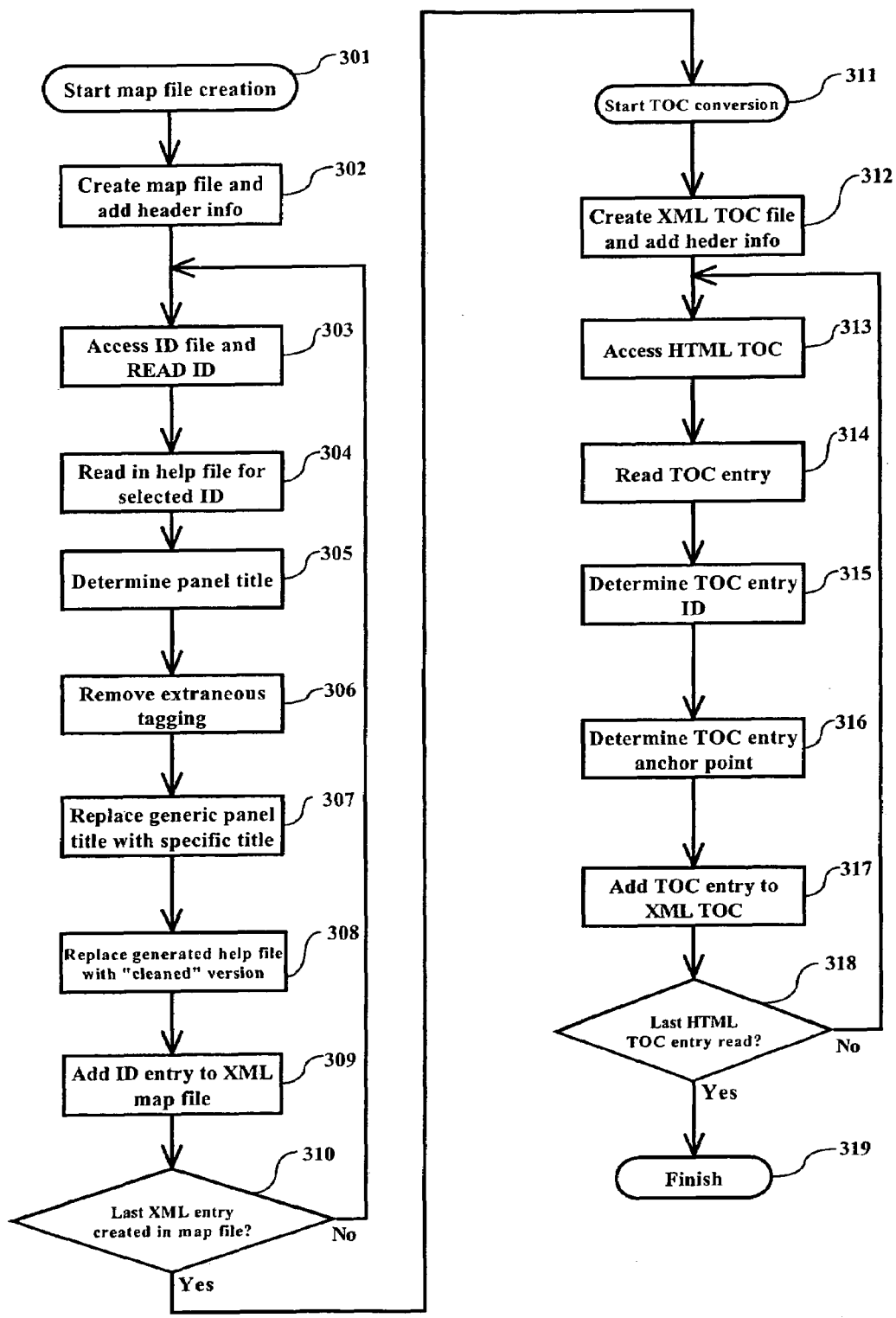
FIG. 3 is a flowchart illustrating the operational steps of the present invention.

FIG. 3 is a flowchart illustrating the operational steps of the present invention. In a preferred embodiment, a software program embodying these operational steps is executed by, for example, clicking on an icon which runs a program to perform the steps of the invention or by other known means of running an executable file. Step 301 begins the process by creating and identifying a map file. The new map file is named and opened and, at step 302, header information is added to the file to both identify the information contained in the map file as being part of an XML map file and to provide a program such as JavaHelp (in this example) and, if used, the GUI portion of the application being developed, with the information necessary to allow proper reading and utilization of the information contained therein. Adding header information to a new file is a well-known process and does not, in and of itself, represent an inventive aspect of this invention.

With any XML or HTML file, the header information must be inserted at the top of the file. This header information is conventional and may include information on what the file is, what the file does, and what pieces of code it accesses. In addition, initial variables are set up which are used by the information access system (JavaHelp in this example) to properly read and access the information in the map file.

At step 303, a "READ ID" for a particular HTML help file to be read by the information access system is selected to be processed. This is accomplished by accessing the original map file created during the conversion from the SGML to HTML versions of the code and selecting the first entry. The READ ID is the equivalent of a "hotlink" and comprises the combination of a Panel Id, a File ID, and a GUI Access ID, each of which are described in more detail below. The following example defines the elements of a typical READ ID:

READ ID: ABSTRACThlpv1439.htm#HDRABSTRACT
Panel ID: ABSTRACT
File ID: hlpv1439.htm
GUI Access ID: #HDRABSTRACT The File ID is simply a file name associated with the particular help information requested by the user. For example, while using an application, the user might be prompted to provide an abstract for work that the user is performing using the application. Wanting to better understand what the application is asking for, the user selects a help button or help key. The application then passes a request (the GUI Access ID "#HDRABSTRACT" in the above example) to the information access system asking that the appropriate help file for "Abstract" be displayed. This causes the system to search in the HTML file for a Panel ID associated with the term "Abstract." Since this Panel ID is associated with the READ ID, which, as noted above, is a "hotlink," it also identifies the actual file name (the File ID) where the "Abstract" help file is stored in the HTML file and the specific location (the GUI Access ID) within that file where the information related to the requested help file will be found.

At step 304, based on the READ ID accessed in step 303, the program scans all of the SGML source files until it locates the file containing the Panel ID (which is part of the READ ID).

At step 305, the program opens the SGML source file located in step 304 and reads through the file until it finds the specified Panel ID (e.g., "ABSTRACT"), and when the Panel ID is located, determines the panel title (this will be designated by a <title> tag in the SGML source file) for the selected Panel ID. This information is copied to the map file.

At step 306, with the new XML map file entry essentially complete, all HTML tagging surrounding the title information is stripped from the title information so that it will not be displayed. Since the XML map file being created is only an interface that allows JavaHelp to properly access and display the HTML help files and, as such, will not be displayed to the user, the HTML tags are extraneous and can be removed.

During the conversion of the SGML source code to HTML, a generic title, such as the name of the product, is generated for each panel. Thus, all of the panels may have the same generic title, such as the name of the program. To make this information more useful, the specific title replaces the generic title so that, for example, the "Abstract" help file will be titled "ABSTRACT". Thus, at step 307, the generic title created during the conversion of the SGML source code to HTML is removed and replaced with a specific title that identifies the particular help file (e.g., "ABSTRACT" in the above example).

At step 308, the help file generated in HTML is replaced with a cleaned up HTML JavaHelp ready version of the help file and at step 309, the map file created at step 302 is utilized to take the identification and READ ID information to create the XML entry in the newly-created map file. This XML entry enables the information access system (e.g., JavaHelp) to map requests to the appropriate "cleaned up" HTML file.

At step 310, a determination is made as to whether or not the file being processed is the last XML entry to be created in the map file (i.e., if the last entry in the original map file has been processed, there are no more XML map entries to be created). If it is not, the process repeats, going back to step 303, and going through steps 303 through 309. If, at step 310, it is determined that the last XML entry was created in the map file, then the process moves to step 311 to create a table of contents (TOC).

Steps 311 through 318 comprise a separate table-of-contents creation program invoked by the first program (steps 302 through 310). Obviously it is not necessary for the two functions to be performed by two programs; the functionality described in the flowchart of FIG. 3 could be performed by a single program or by 3 or more subroutines as is well known.

At step 312, a new empty XML TOC file is designated and opened and the header information is added to the file in a manner similar to that described with respect to step 302. At step 313, the HTML Table of Contents (created during the normal conversion from SGML to HTML) is accessed. This is the table of contents generated by the authoring tool when the original HTML files were generated. At step 314, a table-of-contents entry (e.g., the first one in the HTML TOC) is read from the HTML TOC file. At step 315, the READ ID (containing the Panel ID, the File ID, and the GUI Access ID) is parsed from the HTML TOC entry. Once the GUI Access ID has been determined, the XML map file created in steps 301–310 is scanned until an entry in the XML map file is found that matches the HTML TOC entry under consideration. The Panel Title and Panel ID for the matching XML map file entry (which are part of each XML entry in the XML map file) are parsed from the XML map file. At step 316, the Panel Title, File ID, and Panel ID that correspond to the GUI Access ID for the help panel for which the TOC entry is being created are then used to create an XML version of the TOC entry. This XML TOC entry is then added to the XML TOC file at step 317, so that now a TOC entry in XML format (which is required by the information access system) is linked to a corresponding XML map entry and is available to a user. In the example below, the HTML TOC entry:

<P><B><A NAME="ToC_1" HREF="HLPV603.HTM#HDRSTARTIT">How Do I</A></B><BR> becomes:

<tocitem text="How Do I" target="startit">

Like in step 310, at step 318 a determination is made as to whether or not the last HTML TOC entry has been read. If not, the process iterates back to step 313; if the last TOC entry has been read, then at step 319 the program is finished.

By automating the steps of determining the hotlink and creating the XML table-of-contents entry that corresponds to that hotlink so that the JAVAHELP or other XML program can understand it, the entire conversion process is quick, automated, and complete.

EXAMPLE

What follows are examples of the generation of a mapping file named TCCLIENT.JHM and an associated TOC file called TOCFILE.JHM. The steps utilized to create the mapping file TCCLIENT.JHM correspond to steps 301–310 of FIG. 3, and the steps utilized to create the TOC file TOCFILE.JHM correspond to steps 311–319 of FIG. 3; they are not necessarily described in the order of processing illustrated in FIG. 3.

First, the following headers are placed in the newly created XML mapping file TCCLIENT.JHM:

```
<?xml version='1.0' encoding='ISO-8859-1' ?>
<!-- DOCTYPE map
```

-continued

```
PUBLIC "-//Sun Microsystems Inc.//DTD JavaHelp Map Version 1.0//EN"
    "http://java.sun.com/products/javahelp/map_1_0.dtd"-->
```

The headers identify this file as an XML file, so that any file that reads this file will know it is an XML file and thus knows how to process the file properly.

Next, the following SGML code (a series of READ ID's) is input to the mapping file. This code is a non-XML map file created by the software developer who authored the help files using a "workbench" program (e.g., a documentation creation program such as "Frame Maker") during the SGML to HTML conversion:

```
ABSTRACT hlpv1439.htm#HDRABSTRACT
ACACTNS  hlpv6919.htm#HDRACACTNS
ACBUILD  hlpv6915.htm#HDRACBUILD
ACCACT   hlpv1085.htm#HDRACCACT
ACCECRE  hlpv1091.htm#HDRACCECRE
ACCEDEL  hlpv1094.htm#HDRACCEDEL
ACCELST  hlpv1080.htm#HDRACCELST
ACCERES  hlpv1097.htm#HDRACCERES
ACCFIL   hlpv1084.htm#HDRACCFIL
```

This code is combined with the following information from an SGML source file converted to HTML by the software developer who authored the SGML help source files:

```
<!-- Fragment document type declaration subset: ArborText,
    Inc., 1988–1993, v.4001
<!DOCTYPE IBMIDDOC PUBLIC "+//ISBN 0-933186::
    IBM//DTD IBMIDDoc//EN" [ ]>
-->
<d id='abstract'>
<dprolog>
<titleblk>
<title>&Abstract;
</title>
</titleblk>
</dprolog>
<dbody>
<il><idxterm>overview of &abstract; field</idxterm>
</il>
<dl>
&ABSTRACT;
</dl>
</dbody>
</d>
``` to create the following content stored in the XML map file TCCLIENT.JHM:

```
<map version="1.0">
    <mapID target="abstract"  url="enu/hlpv1439.htm#HDRABSTRACT"/>  <!--
Abstract -->
    <mapID target="acactns"   url="enu/hlpv6919.htm#HDRACACTNS"/>   <!--
Shipped Access Authority by Actions -->
    <mapID target="acbuild"   url="enu/hlpv6915.htm#HDRACBUILD"/>   <!--
Builder -->
    <mapID target="accact"    url="enu/hlpv1085.htm#HDRACCACT"/>    <!--
Selected Menu for Access Lists -->
    <mapID target="accecre"   url="enu/hlpv1091.htm#HDRACCECRE"/>   <!--
Add Access -->
    <mapID target="accedel"   url="enu/hlpv1094.htm#HDRACCEDEL"/>   <!--
Remove Access -->
    <mapID target="accelst"   url="enu/hlpv1080.htm#HDRACCELST"/>   <!--
```

-continued

| | | |
|---|---|---|
| Access Filter --> | | |
| <mapID target="acceres" | url="enu/hlpv1097.htm#HDRACCERES"/> | <!-- |
| Restrict Access --> | | |
| <mapID target="accfil" | url="enu/hlpv1084.htm#HDRACCFIL"/> | <!-- |
| File Menu for Access Lists --> | | |
| <mapID target="acchlp" | url="enu/hlpv1090.htm#HDRACCHLP"/> | <!-- |
| Help Menu for Access Lists --> | | |
| <mapID target="acclead" | url="enu/hlpv6917.htm#HDRACCLEAD"/> | <!-- |
| Componentlead --> | | |
| <mapID target="accopt" | url="enu/hlpv1089.htm#HDRACCOPT"/> | <!-- |
| Windows Menu for Access Lists --> | | |
| <mapID target="accsel" | url="enu/hlpv1086.htm#HDRACCSEL"/> | <!-- |
| Edit Menu for Access Lists --> | | |
| <mapID target="accshow" | url="enu/hlpv1100.htm#HDRACCSHOW"/> | <!-- |
| Show Authority Actions --> | | |

The program that is executing this process reads the first entry in the first file:
ABSTRACT hlpv1439.htm#HDRABSTRACT
from this the program determines that:
the panel ID is "ABSTRACT"
the filename is "hlpv1439.htm" and
the GUI Access ID is "#HDRABSTRACT".
Now, knowing the panel ID, the program scans all of the source files until it finds the SGML source file containing the panel ID (the second file). The program then scans through the tagging in this file until it locates the specific portion of the source that contains the panel id. The program then determines what the panel title is by locating the portion of the source preceded by the "<title>" tag.
   <title>&Abstract;

From this line, the program determines that the panel title is "Abstract".
Now, the program has determined the panel ID, the file name, the GUI access ID, and the panel title. This information is then used to build the XML map file entry (the third file). The panel ID becomes the target, the file name and the GUI Access ID are combined with the prespecified path (enu/—which is known to the program executing the process) to create the url and the panel title is added at the end enclosed in "<!--" & "-->". With this information and the required XML tagging ("<mapid" & "/>") the following XML map entry is ready to be added to the XML map file:
<mapID     target="abstract"     url="enu/hlpv1439.htm#HDRABSTRACT"/> <!--Abstract-->

This process is repeated for each entry in the generated map file (the first file).

The combining of the SGML codes with the information extracted from the SGML source file is accomplished as follows. First, the XML map file entry is started with a map ID tag ("<MAPID"). Next, extracting information from an entry (line) in the series of READ ID's, the Panel ID (e.g., "ABSTRACT") becomes the target, and the file name (e.g., "HLPV1439.HTM") and the GUI access ID (e.g., "#HDRABSTRACT") become the URL and the appropriate end tag ("/>") is added. Next, from the SGML source file, the panel title (preceded by the "<title>" tag) is extracted and added to the XML entry (the text enclosed in "<!--" and "-->"). This completes the XML map file entry. This is repeated for each entry until the file is completed. The file TCCLIENT.JHM now contains all of the necessary information that the information access system needs to display the proper information (e.g., a help panel) when the user, via a GUI or keyboard, sends a request for information.

The generation of the table of contents file TOCFILE.JHM is similar in nature to the generation of the mapping file. First, headers are added as follows:

```
<?xml version='1.0' encoding='ISO-8859-1' ?>
<!DOCTYPE toc
    PUBLIC "-//Sun Microsystems Inc.//DTD JavaHelp TOC Version
    1.0//EN"
        "http://java.sun.com/products/javahelp/toc_1_0.dtd">
```

Next, the following HTML input is created in a known manner by the authoring tool used to convert the SGML source files to HTML:

```
<!DOCTYPE HTML PUBLIC "-//IETF//DTD HTML 3//EN">
<HTML><HEAD>
<TITLE>TeamConnection</TITLE>
<!-- Begin Header Records =========================================  -->
<!-- C:\IDWBWIN\TEMP\idwt1149\hlpv6.scr converted by idb2h R4.02      -->
<!-- (338) ID Workbench Version (WINNT-WIN95) on 26 May 1999 at       -->
<!-- 16:15:09                                                          -->
<!-- (C) Copyright IBM Corporation, 1998                               -->
<!-- All rights reserved. Licensed Materials Property of IBM           -->
<!-- Note to US Government users                                       -->
<!-- Documentation related to restricted rights                        -->
<!-- Use, duplication or disclosure is subject to restrictions         -->
<!-- set forth in GSA ADP Schedule with IBM Corp.                      -->
<META HTTP-EQUIV="Content-Type" CONTENT="text/html; charset=iso-8859-1">
<META HTTP-EQUIV="updated" CONTENT="Wed, 26 May 1999 16:15:08">
<META HTTP-EQUIV="review" CONTENT="Fri, 26 May 2000 16:15:08">
```

-continued

```
<META HTTP-EQUIV="expires" CONTENT="Sat, 26 May 2001 16:15:08">
</HEAD><BODY BGCOLOR="#FFFFFF">
<img src="bannerx.gif" border=0 height=92 width=490 alt="IBM Books">
<br>
<!-- End Header Records ===========================================    -->
<A NAME="Top_Of_Page"></A>
<H1>TeamConnection</H1>
<HR><H2><A NAME="ToC">Table of Contents</A></H2>
<P><B><A NAME="ToC_1" HREF="HLPV603.HTM#HDRSTARTIT">How Do I</A></B><BR>
<MENU>
<LI><A NAME="ToC_2" HREF="HLPV604.HTM#HDRHDI0000">Find My Process</A>
<LI><A NAME="ToC_3" HREF="HLPV605.HTM#HDRHDI0010">Find My Family's
Component Structure</A>
<LI><A NAME="ToC_4" HREF="HLPV606.HTM#HDRHDI0100">Displaying Available
Tasks</A>
<LI><A NAME="ToC_5" HREF="HLPV607.HTM#HDRHDI0200">Update Tasks on the Tasks
Window</A>
<MENU>
<LI><A NAME="ToC_6" HREF="HLPV608.HTM#HDRHDI0201">Add a Task to the Tasks
Window</A>
<LI><A NAME="ToC_7" HREF="HLPV609.HTM#HDRHDI0202">Edit the Tasks Window</A>
<LI><A NAME="ToC_8" HREF="HLPV610.HTM#HDRHDI0203">Delete a Task from the
Tasks Window</A>
</MENU>
<LI><A NAME="ToC_9" HREF="HLPV611.HTM#HDRHDI0300">Become a Different User
ID</A>
<LI><A NAME="ToC_10" HREF="HLPV612.HTM#HDRHDI0350">Reorder Columns on an
Object Window</A>
<LI><A NAME="ToC_11" HREF="HLPV613.HTM#HDRHDI0400">Search for Objects</A>
<MENU>
<LI><A NAME="ToC_12" HREF="HLPV614.HTM#HDRHDI0401">Search for Parts</A>
<LI><A NAME="ToC_13" HREF="HLPV615.HTM#HDRHDI0402">Set Up a Query</A>
<LI><A NAME="ToC_14" HREF="HLPV616.HTM#HDRHDI0403">Add a Query to the Tasks
Window from a Filter Window</A>
<LI><A NAME="ToC_15" HREF="HLPV617.HTM#HDRHDI0404">Define a Query</A>
<LI><A NAME="ToC_16" HREF="HLPV618.HTM#HDRHDI0405">Sort a Query</A>
<LI><A NAME="ToC_17" HREF="HLPV619.HTM#HDRHDI0406">Edit the Query Line on an
Object Window</A></MENU>
``` and is combined with the information in the newly created TCCLIENT.JHM file to create an XML version of the TOC as follows:

```
<toc version="1.0">
    <tocitem text="Table of Contents">
        <tocitem text="How Do I" target="startit">
            <tocitem text="Find My Process" target="hdi0000"/>
            <tocitem text="Find My Family's Component Structure"
target="hdi0010"/>
            <tocitem text="Displaying Available Tasks" target="hdi0100"/>
            <tocitem text="Update Tasks on the Tasks Window" target="hdi0200">
                <tocitem text="Add a Task to the Tasks Window"
target="hdi0201"/>
                <tocitem text="Edit the Tasks Window" target="hdi0202"/>
                <tocitem text="Delete a Task from the Tasks Window"
target="hdi0203"/>
            </tocitem>
            <tocitem text="Become a Different User ID" target="hdi0300"/>
            <tocitem text="Reorder Columns on an Object Window"
target="hdi0350"/>
            <tocitem text="Search for Objects" target="hdi0400">
                <tocitem text="Search for Parts" target="hdi0401"/>
                <tocitem text="Set Up a Query" target="hdi0402"/>
                <tocitem text="Add a Query to the Tasks Window from a Filter
Window" target="hdi0403"/>
                <tocitem text="Define a Query" target="hdi0404"/>
                <tocitem text="Sort a Query" target="hdi0405"/>
                <tocitem text="Edit the Query Line on an Object Window"
target="hdi0406"/>
            </tocitem>
```

The XML TOC file (shown immediately above) is a creation based on the information contained in the two files listed before it (the XML map file generated in accordance with steps 301–310 and the HTML TOC file (generated by the SGML conversion tools)). First, the XML TOC entry is started with a TOC tag ("<TOCITEM"). Next, a TOC entry is read from the HTML TOC file:

<P><B><A NAME="ToC_1" HREF="HLPV603.HTM#HDRSTARTIT">How Do I</A></B><BR>)

From this TOC entry, the file name ("HLPV603.HTM") and the GUI access ID ("#HDRSTARTIT") are determined. Next, using the GUI access ID, the XML map file is scanned until a match is found:

<mapID target="startit" url="enu/hlpv0428.htm#HDRSTARTIT"/> <!--How Do I . . . -->

The panel title ("HOW DO I . . . ") and Panel ID ("STARTIT") are extracted from this matching entry and are added to the XML TOC entry. Finally, the TOC tag is ended with the appropriate end tag ("/>"). This completes the XML TOC entry:

<tocitem text="How Do I" target="startit"> which is then added to the XML TOC file. These steps are repeated for each entry until all entries have been addressed.

Thus, once these tasks are completed, two files, TCCLIENT.JHM and TOCFILE.JHM, have been created. Once the creation of the XML files has been completed, each of the HTML files (the HTML help content files created by the workbench) are scanned and all extraneous information and tagging inserted by the workbench is removed from the files. This includes (but is not limited to) items such as TOC links, titles and navigation aids. The functions/information provided by these items becomes redundant due to similar functions/information provided by the information access system.

The highlighted (bold text) items below are an example of the type of information removed from typical HTML help files created during the SGML to HTML conversion process:

```
<!DOCTYPE HTML PUBLIC "-//IETF//DTD HTML 3//EN">
<HTML><HEAD>
<TITLE>TeamConnection</TITLE>
<!-- Begin Header Records =========================================    -->
<!-- C:\IDWBWIN\TEMP\idwt1149\hlpv6.scr converted by idb2h R4.02         -->
<!-- (338) ID Workbench Version (WINNT-WIN95) on 26 May 1999 at          -->
<!-- 16:15:09                                                            -->
<!-- (C) Copyright IBM Corporation, 1998                                 -->
<!-- All rights reserved. Licensed Materials Property of IBM             -->
<!-- Note to US Government users                                         -->
<!-- Documentation related to restricted rights                          -->
<!-- Use, duplication or disclosure is subject to restrictions           -->
<!-- set forth in GSA ADP Schedule with IBM Corp.                        -->
<META HTTP-EQUIV="Content-Type" CONTENT="text/html; charset=iso-8859-1">
<META HTTP-EQUIV="updated" CONTENT="Wed, 26 May 1999 16:15:08">
<META HTTP-EQUIV="review" CONTENT="Fri, 26 May 2000 16:15:08">
<META HTTP-EQUIV="expires" CONTENT="Sat, 26 May 2001 16:15:08">
</HEAD><BODY BGCOLOR="#FFFFFF">
<img src="bannerx.gif" border=0 height=92 width=490 alt="IBM Books">
<br>
<!-- End Header Records ===========================================    -->
<A NAME="Top_Of_Page"></A>
<H1>TeamConnection</H1>
<P>
<H1><A NAME="HDRSTARTIT" HREF="HLPV602.HTM#ToC_1">How Do I</A></H1>
<P>Before you start working with TeamConnection, you should
know which <A HREF="HLPV604.HTM#HDRHDI0000">process</A> your family
administrator has defined
for your component and release.
<P>Select one of the following task groups:
<DL>
<DD><P><A HREF="HLPV611.HTM#HDRHDI0300">Become a different user</A>
<DD><P><A HREF="HLPV612.HTM#HDRHDI0350">Reorder Columns on an Object
Window</A>
<DD><P><A HREF="HLPV604.HTM#HDRHDI0000">Find my process</A>
<DD><P><A HREF="HLPV605.HTM#HDRHDI0010">Find my family's component
structure</A>
<DD><P><A HREF="HLPV613.HTM#HDRHDI0400">Search for objects</A>
<DD><P><A HREF="HLPV606.HTM#HDRHDI0100">Display TeamConnection tasks</A>
<DD><P><A HREF="HLPV607.HTM#HDRHDI0200">Update tasks on the Tasks
window</A>
<DD><P><A HREF="HLPV620.HTM#HDRHDI0500">Use filter windows</A>
<DD><P><A HREF="HLPV664.HTM#HDRHDI0910">Use the <B>Import</B> push
button</A>
<DD><P><A HREF="HLPV621.HTM#HDRHDI0600">Use work areas</A>
<DD><P><A HREF="HLPV632.HTM#HDRHDI0700">Work with components</A>
<DD><P><A HREF="HLPV662.HTM#HDRHDI0900">Work with defects and features</A>
<DD><P><A HREF="HLPV637.HTM#HDRHDI0800">Work with parts</A>
<DD><P><A HREF="HLPV688.HTM#HDRHDI1300">Work with fix records</A>
<DD><P><A HREF="HLPV673.HTM#HDRHDI1000">Work with drivers</A>
<DD><P><A HREF="HLPV679.HTM#HDRHDI1100">Work with releases</A>
<DD><P><A HREF="HLPV692.HTM#HDRHDI1200">Work with verification records</A>
```

-continued

```
<DD><P><A HREF="HLPV693.HTM#HDRHDI1500">Build applications</A>
<DD><P><A HREF="HLPV6106.HTM#HDRHDI1400">Reset attributes</A>
<DD><P><A HREF="HLPV1419.HTM#HDRHLPPRT">Print help panels</A>
</DL>
<P>There might be more than one way to complete the tasks described in "How
Do
I." For an example, refer to <A HREF="HLPV609.HTM#HDRHDI0202">Edit the
Tasks
Window</A>.
<P>Refer to fields help for more specific information about the fields on a
window.
<P><HR><B>[ <A HREF="#Top_Of_Page">Top of Page</A> | <A
HREF="HLPV602.HTM">Previous Page</A> |
<A HREF="HLPV604.HTM">Next Page</A> | <A HREF="HLPV602.HTM#ToC">Table of
Contents</A> ]</B>
<A NAME="Bot_Of_Page"></A>
</BODY></HTML>
```

The tagging removal process is performed in a conventional manner using automated techniques to speed up the process.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. In a computing environment having a system which makes content available for use by a subsystem, said content being converted from source files in a first data format to presentation files in a second data format, said subsystem reading said content in a third data format other than said first or second data formats, a computerized method of indexing said content so that it can be correctly accessed and displayed by said subsystem, comprising the steps of:
   extracting identifying information from said source file;
   creating a map file in said third data format containing said extracted identifying information;
   configuring said subsystem to access and display said presentation files in said second data format based on said map file; and
   creating a first Table Of Contents (TOC) file in said second data format; and
   generating a second TOC file in said third format based on said first TOC file and said map file.

2. A method as set forth in claim 1, wherein said third data format is Extensible Markup Language (XML).

3. A method as set forth in claim 1, wherein said second data format is HyperText Markup Language (HTML).

4. A method as set forth in claim 1, wherein said first data format is Standardized General Markup Language (SGML).

5. A method as set forth in claim 1, wherein said first data format is Standardized General Markup Language (SGML), said second data format is HyperText Markup Language (HTML), and said third data format is Extensible Markup Language (XML).

6. A method as set forth in claim 1, wherein said creating step includes the removal of extraneous coding of said second format from said map file.

7. A method as set forth in claim 1, wherein said step of generating said second TOC file includes the steps of:
   reading each entry in said first TOC file;
   matching each entry in said first TOC file with a corresponding entry in said map file; and
   extracting data corresponding to each matched entry and storing said extracted data in said second TOC file.

8. In a computing environment having a system which makes content available for use by a subsystem, said content being converted from source files in a first data format to presentation files in a second data format, said subsystem reading said content in a third data format other than said first or second data formats, computer readable medium containing computer readable code readable by a computer in said environment, for indexing said content so that it can be correctly accessed and displayed by said subsystem, comprising:
   a subprocess for extracting identifying information from said source file;
   a subprocess for creating a map file in said third data format containing said extracted identifying information;
   a subprocess for configuring said subsystem to access and display said presentation files in said second data format based on said map file; and
   a subprocess for creating a first Table Of Contents (TOC) file in said second data format; and
   a subprocess for generating a second TOC file in said third format based on said first TOC file and said map file.

9. Computer readable medium as set forth in claim 8, wherein said third data format is Extensible Markup Language (XML).

10. Computer readable medium as set forth in claim 8, wherein said second data format is HyperText Markup Language (HTML).

11. Computer readable medium as set forth in claim 8, wherein said first data format is Standardized General Markup Language (SGML).

12. Computer readable medium as set forth in claim 8, wherein said first data format is Standardized General Markup Language (SGML), said second data format is HyperText Markup Language (HTML), and said third data format is Extensible Markup Language (XML).

13. Computer readable medium as set forth in claim 8, wherein said creating subprocess includes a step for removing of extraneous coding of said second format from said map file.

14. Computer readable medium as set forth in claim 8, wherein said subprocess of generating said second TOC file includes the steps of:

reading each entry in said first TOC file;

matching each entry in said first TOC file with a corresponding entry in said map file; and extracting data corresponding to each matched entry and storing said extracted data in said second TOC file.

15. A system for making content available in a computing environment for use by a subsystem, said content being converted from source files in a first data format to presentation files in a second data format, said subsystem reading said content in a third data format other than said first or second data formats, said content being indexed so that it can be correctly accessed and displayed by said subsystem, comprising:

means for extracting identifying information from said source file;

means for creating a map file in said third data format containing said extracted identifying information;

means for configuring said subsystem to access and display said presentation files in said second data format based on said map file; and means for creating a first Table Of Contents (TOC) file in said second data format; and means for generating a second TOC file in said third format based on said first TOC file and said map file.

16. The system as set forth in claim 15, wherein said third data format is Extensible Markup Language (XML).

17. The system as set forth in claim 15, wherein said second data format is HyperText Markup Language (HTML).

18. The system as set forth in claim 15, wherein said first data format is Standardized General Markup Language (SGML).

19. The system as set forth in claim 15 wherein said first data format is Standardized General Markup Language (SGML), said second data format is HyperText Markup Language (HTML), and said third data format is Extensible Markup Language (XML).

20. The system as set forth in claim 15, wherein said creating subprocess includes a step for removing of extraneous coding of said second format from said map file.

21. The system as set forth in claim 15, wherein said subprocess of generating said second TOC file includes the steps of:

reading each entry in said first TOC file;

matching each entry in said first TOC file with a corresponding entry in said map file; and extracting data corresponding to each matched entry and storing said extracted data in said second TOC file.

\* \* \* \* \*